United States Patent [19]
Jones et al.

[11] 3,801,142
[45] Apr. 2, 1974

[54] FLUID COUPLING

[75] Inventors: Alan L. Jones, Endwell; George T. Judson, Whitney Point; Robert M. Kellogg, Endwell, all of N.Y.

[73] Assignee: International Business Machines Corporation, Armonk, N.Y.

[22] Filed: June 30, 1972

[21] Appl. No.: 267,815

[52] U.S. Cl.............. 285/280, 233/1 A, 285/375
[51] Int. Cl........................... F16l 27/00, B04b 7/00
[58] Field of Search....... 285/280, 279, 281, 9, 375; 277/88, 92, 96; 233/1 A

[56] References Cited
UNITED STATES PATENTS

| | | | |
|---|---|---|---|
| 3,565,330 | 2/1971 | Latham | 277/88 X |
| 3,460,857 | 8/1969 | Larkin | 277/88 X |
| 3,195,931 | 7/1965 | Braunagel | 285/375 X |
| 3,122,375 | 2/1964 | Greenwald | 277/88 |
| 2,805,086 | 9/1957 | Shumaker | 285/279 X |
| 3,201,135 | 8/1965 | Hayatian | 277/92 |
| 2,890,901 | 6/1959 | Martin | 277/88 X |
| 2,779,611 | 1/1957 | Wernert | 277/92 X |
| 3,391,942 | 7/1968 | Wilson | 277/96 R X |
| 2,662,480 | 12/1953 | Cliborn | 277/88 X |

*Primary Examiner*—Thomas F. Callaghan
*Attorney, Agent, or Firm*—Paul M. Brannen

[57] ABSTRACT

An improved fluid coupling permitting relative rotation between two rotatable fluid-tight seal elements, having confronting annular fluid-tight surfaces, maintained in a fluid-tight relationship by axial compression of a length of elastic tubing forming one of the fluid connections to said seal elements.

1 Claim, 4 Drawing Figures

PATENTED APR 2 1974  3,801,142

FLUID COUPLING

BACKGROUND OF THE INVENTION

1. Field of the Invention

The invention relates broadly to fluid coupling devices and particularly to an improved fluid coupling device permitting relative rotation between two fluid conduits or tubes, with no leakage in the coupling.

2. Description of the Prior Art

There are many fluid coupling devices known in the prior art, but most of these require a large number of parts, or are composed of materials which are not suited to use in handling particular fluids or in particular environments. Typical of the prior art is U.S. Pat. No. 2,459,201 issued to T. R. Thomas. This seal structure provides a fluid-tight rotating seal, but requires a plurality of elements and contemplates a grease seal or other material to provide a fluid-tight coupling. In uses where the coupling must be simple and economical, as in "one time" or expendable uses in connection with fluid systems handling human blood, the prior art does not offer a device which is economical, easily sterilized, and not adversely affected by the environment, and, on the other hand, having no deleterious effects on the fluid being handled. The seal structure shown herein is also an improvement over that disclosed and claimed in a co-pending application for Letters Patent of the United States, Ser. No. 231,620, filed on Mar. 3, 1972, now abandoned, and assigned to the same assignee as this application.

SUMMARY OF THE INVENTION

The present invention solves the problems recited above by providing a fluid coupling comprising only a few elements, each of which can be made of material suited to the fluid to be handled, and economical enough to be expendable.

Accordingly, it is a principal object of the invention to provide an improved fluid coupling having a minimum number of parts and especially adapted to have an inert effect on the fluid to be handled.

Another object of the invention is to provide an improved fluid coupling device which is sufficiently economical in parts as to be disposable after a single use.

The invention contemplates a pair of seal elements having confronting annular fluid-tight sealing surfaces, of non-corrodable material maintained in a rotatable but fluid-tight relationship by axial compression of a length of elastic tubing forming one of the fluid connections to said seal elements.

The foregoing and other objects, features and advantages of the invention will be more apparent from the following more particular description of a preferred embodiment of the invention, as illustrated in the accompanying drawings.

BRIEF DESCRIPTION OF THE DRAWINGS

Similar reference characters refer to similar parts in each of the several views.

DETAILED DESCRIPTION OF THE DRAWINGS

Figure 1:
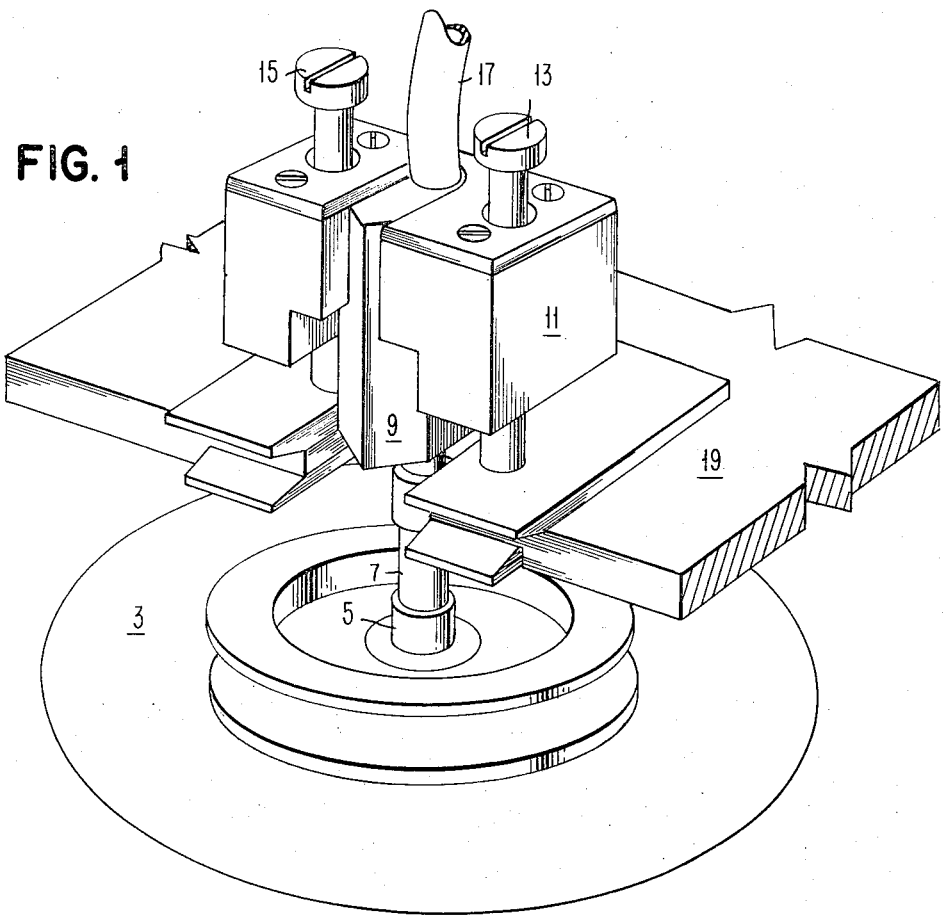
FIG. 1 is a diagrammatic illustration of a perspective view of a preferred embodiment of the invention.

Referring to the drawings, FIG. 1 shows a perspective diagrammatic view of a preferred embodiment of the invention, showing the apparatus in its operative relation to a blood washing apparatus with which it is particularly designed to cooperate. The centrifuge mechanism indicated generally by reference character 3 is arranged to contain a flexible blood container, provided with a central collar 5 and inlet tube 7, by which blood to be processed along with other solutions may be admitted to or recovered from the processing bag while the centrifuge is in operation. Centrally positioned over the tube 7 and on the axis of the rotation of the centrifuge is the seal body 9, which has an outer body having an outer surface which is non-circular to prevent rotation. In a preferred form of the invention, the seal body is hexagonal in form as shown. A weight 11 is provided which is arranged to be freely movable up and down on two supporting members such as the bolts 13 and 15. In the position shown, the weight will exert a downward force on the uppermost face of the seal body 9, to thereby transmit a sealing force through the internal parts of the seal in the manner to be subsequently explained. From the top of the seal 9, a non-rotating hose or tubing 17 extends to the remainder of the apparatus containing the washant solutions and the necessary connections and plumbing to operate the apparatus, none of which is shown in detail since it forms no part of the invention. The bolts 13 and 15 are retained in a cover element 19, which is one of a pair of slidable covers, which, when opened, provide access to the centrifuge for the purpose of inserting or removing the blood container. When the covers are slid to the closed position, then the seal may be supported and restrained by weight 11.

Figure 2:
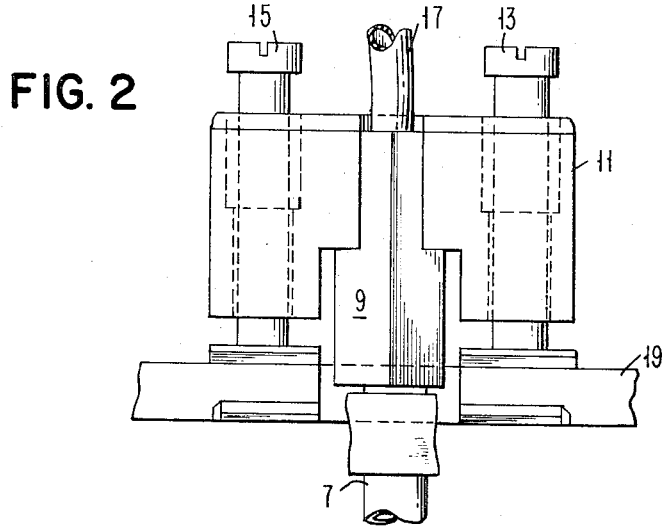
FIG. 2 illustrates a front elevational view of the device shown in FIG. 1.

The relationship of the seal element 9 to the weight 11 and the supporting studs or bolts 13 and 15 can also be seen in FIG. 2 of the drawings, which constitutes an elevational diagrammatic view of the apparatus. It will be noted that the openings in the weight assembly 11 are counterbored to the extent that the weight 11 can be raised sufficiently far to clear the seal 9 during the time that the seal and the associated blood bag are being installed or removed from the centrifuge.

Figure 3:
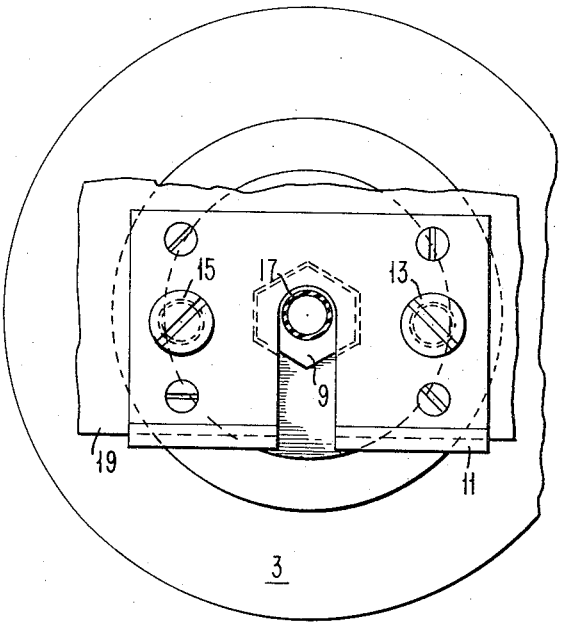
FIG. 3 is a top view of the device shown in FIG. 1.

FIG. 3 is a top or plan view illustrating the relationship of the seal body 9 and the weight 11. It will be noted that the seal 9 is hexagonal in its cross-sectional shape, as well as the recess in the weight 11. Thus the seal body 9 is prevented from rotating by the engagement of the non-circular outer surfaces of the seal and the mating surfaces in the receiving cavity in weight 11.

Figure 4:
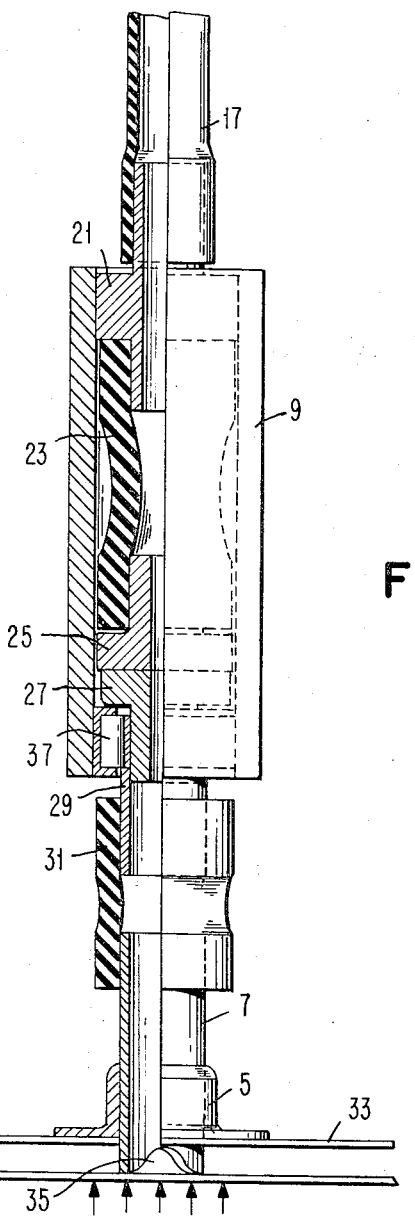
FIG. 4 is a cross-sectional elevational view of the device shown in FIG. 1.

FIG. 4 is a diagrammatic elevational view, partly in cross-section, of the seal body and its associated parts, showing the internal structure of the seal.

As shown in FIG. 4, the fluid path includes the flexible tube 17, which is fitted onto a seal housing adapter 21. At the lower end of the housing adapter 21 there is provided a link of highly flexible tubing 23, such as surgical rubber tubing, which in turn connects with a first seal element 25, preferably made of suitable ceramic material. The first seal element confronts a second seal element 27 which has attached thereto a rigid plastic tubing section 29, and then a connecting link of highly flexible tubing 31, which is attached to the blood bag in the centrifuge by means of the tubing 7 and the collar 5. The tubing 7 extends through the collar 5 and projects into the interior of the bag 33. The end of tubing 7 is notched 35 to allow the flow of fluids into and out of the bag. This extension of tube 7 provides a minimum clearance between the top and bottom of the bag, even when a force is exerted on the bag, so that flow can freely take place between the remainder of the bag and the collar 5 and tubing 7.

The function of the seal is to allow entry and removal of fluids, particularly blood and wash solutions, but also supernatant fluids that are originally in the blood, such as plasma, or in the case of frozen blood, the cryoprotective agents added before freezing, with this entry occurring sometimes with the blood bag being stationary in the centrifuge, and sometimes while it is being oscillated back and forth, and still other times when it is continuously spinning at speeds up to 3300 rpm. The seal must operate at reasonable pressures, for example, eight pounds per square inch or more, at rotational speeds up to 3,300 rpm without lubrication and also without causing temperature rise of the rotating parts beyond 30° F. above ambient.

The seal must also assure no loss of blood nor allow any opening which would make the blood or the solutions nonsterile, both while it is in storage and while it is in use. At the same time, the manufacturing tolerances for the plastic blood bags are such that the seal must function even when the bag collar and stem and the bag are not concentrically located under the stationary upper half of the seal.

These objectives are obtained by the present structure as follows. The two seal elements 25 and 27 are lapped optically flat on their mating faces. The faces may or may not be coated with a suitable silicon composition to provide fluid repellency. The two seal elements are then assembled and spring-loaded together by the following steps: Seal half 27 and tube 29 are pressed together to form an assembly. The seal bearing assembly 37 is pressed into the seal housing 9. This seal bearing assembly is made of a felt ring supported in a housing of metal or other rigid material, and acts as a bearing which by its composition does not require lubrication, does not overheat the plastic tube 29 and yet supports and guides the lower rotating seal element 27. Additionally it has the capacity to absorb and retain any minor fluid weepage that may occur at the seal faces, thus acting as both a bearing and a secondary sealing device.

Seal element 27 and tubing 29 are dropped from above into the bearing 37; then a second subassembly consisting of the adapter 21, the flexible tubing 23 and the upper seal element 25 are dropped into the housing. Next an axial force equal to approximately 0.6 pound is applied to the adapter 21. This force compresses the flexible latex tube 23 which thereafter serves in the function of a spring to load the two faces of the ceramic seal elements 25 and 27 together. Adapter 21 is then cemented into the housing 9 by a quick acting cement or by heat acting on the thermal plastic. With the seal thus assembled, the confronting faces of the ceramic seal elements are preloaded together by a 0.6 pound load by reason of the fact that the underside of the rotating ceramic seal element 27 is pushed up against the upper face of the felt bearing seal 37. At this time it should be noted that the flexible tubing 23 not only acts to provide the necessary spring force, but also carries the torque caused by friction at the rotating faces of the ceramic seal elements 25 and 27. Also it is essential that the tubing section 23 be flexible to allow the stationary ceramic seal element 25 to rock and oscillate as is required if it is to follow the perturbations of the lower seal element 27 that occur due to the previously discussed eccentricities in the blood bag and its associated stem.

When the bag stem tubing 7 and the entrance tube 17 are attached to the seal, the seal is at that time closed by the 0.6 pound load and thus is effective in maintaining sterility within the system as well as preventing fluid leaks if the associated bag is full of fluid. An important feature of the present invention is that if a pull force is exerted on the bag stem or on the entry tube, the force so applied cannot act to pull the seal faces open. The force thus applied goes from the seal adapter 21 to the seal body 9, thence to the seal bearing 37, to the tube 29 and the flexible tubing 31, but bypasses the flexible tubing 23 and upper seal element 25.

Tubing section 31 must also be sufficiently flexible to allow the bag and stem to wobble due to the lack of concentricity and yet have sufficient stiffness to carry the required torque and yet not transmit side load due to the wobble that would otherwise tend to open the seal faces during high speed rotation.

In use, the associated bag and seal assembly and the entry tube 17, all assembled as a unit, will be installed in the centrifuge bowl, and then the weight 11 or some other suitable force such as a suitably confined spring force is applied to produce one to two pounds force at the upper end of the seal housing 9.

The load applied at the top of the seal body or housing 9 is transmitted axially down through the seal assembly causing the bag under the stem to be pressed down against a portion of the centrifuge bowl within which it is disposed. As previously pointed out, the projection of tubing 7 in the bottom of the adapter collar will keep the fluid path into the bag open. The 1- to 2-pound force on the seal housing serves two purposes. First it brings the unit pressure on the faces of the rotating seal elements 25 and 27 up to a level that will seal fluids at pressures up to 8 pounds per square inch or more, and secondly, it further compresses the flexible tubing 23 with the result that the lower ceramic element 27 rises up off its contact with the seal bearing element 37, and therefore it does not rub against the seal bearing element during rotation. At the same time the seal bearing element 37 guides the lower ceramic seal element 6 loosely but sufficiently accurately to prevent its outside diameter from rubbing on the inside diameter of the seal housing 9. Also because there is clearance at the outside diameter of the seal element 27 it is entirely free to rock as much as may be dictated by the eccentricity of the stem and bag. The upper seal element is somewhat larger in diameter, as can be seen from the drawings, so that it is guided by the inner diameter of the seal housing 9. However, the fit is such that it is free to move up and down under the influence of the axial load and also sufficiently free that it can rock and wobble as required to stay in intimate contact with the other ceramic seal element.

While the invention has been particularly shown and described with reference to a preferred embodiment thereof, it will be understood by those skilled in the art that various changes in form and details may be made therein without departing from the spirit and scope of the invention.

We claim:

1. A rotatable fluid coupling comprising, in combination, a hollow seal body having a non-circular periphery and having an axially-aligned cavity therein, a first and a second ceramic seal element disposed in said cavity, said seal elements having confronting annular surfaces lapped to a fluid-tight smoothness, a first section of flexible elastic tubing disposed within said seal body, having one end thereof connected to one of said seal elements, a seal adapter element fixed in said seal body and having an axial bore therethrough, and a portion connected to said flexible tubing section, means for supporting said ceramic seal elements within said seal body, means for applying a compressional force to said ceramic seal elements by axially compressing said flexible elastic tubing comprising a weight which rests on said seal body when the coupling is operative, said weight having a non-circular cavity for receiving said seal body in a non-rotatable relationship, and having a slotted portion admitting a tubing connection to said body, and a second elastic tubing section external to said seal body for establishing a fluid connection to the seal element confronting the element connected to the section of elastic tubing within the seal body.

* * * * *